United States Patent
Valadez

(10) Patent No.: US 7,295,951 B2
(45) Date of Patent: Nov. 13, 2007

(54) SYSTEM AND METHOD FOR QUANTIFYING THE QUALITY OF MOTION CORRECTION IN IMAGE REGISTRATION

(75) Inventor: Gerardo Hermosillo Valadez, Exton, PA (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 16 days.

(21) Appl. No.: 11/328,909

(22) Filed: Jan. 10, 2006

(65) Prior Publication Data
US 2006/0224363 A1 Oct. 5, 2006

Related U.S. Application Data

(60) Provisional application No. 60/668,013, filed on Apr. 4, 2005.

(51) Int. Cl.
G06F 11/00 (2006.01)
G06F 15/00 (2006.01)
(52) U.S. Cl. ...................................................... 702/182
(58) Field of Classification Search ................ 702/182
See application file for complete search history.

(56) References Cited

U.S. PATENT DOCUMENTS 6,611,615 B1 8/2003 Christensen

FOREIGN PATENT DOCUMENTS

WO WO 2004/051571 A2 6/2004

OTHER PUBLICATIONS

Modersitzki, "Numerical Methods for Image Registration", 2004, Oxford University Press, pp. 121-129.*
"Numerical Methods for Image Registration", Modersitzki, 2004, Oxford University Press, pp. 121-129.
"Consistent Image Registration", Christensen et al., IEEE Trans. on Medical Imaging, vol. 20, No. 7, Jul. 2001, pp. 568-582.
"Topology Preserving Deformable Image Matching Using Constrained Hierarchical Parametric Models", Musse et al., IEEE Trans on Image Proc., vol. 10, No. 7, Apr. 2001, pp. 1081-1093.
"Volume-Preserving Nonrigid Registration of MR Breast Images Using Free-Form Deformation with an Incompressibility Constraint", Rohlfing et al., IEEE Transactions on Medical Imaging, vol. 22, No. 6, Jun. 2003, pp. 730-741.

(Continued)

Primary Examiner—John Barlow
Assistant Examiner—Cindy D. Khuu

(57) ABSTRACT

A method of evaluating the quality of a deformation field includes providing a deformation field from a first domain to a second domain, where a deformation field $\Phi=(\phi_x,\phi_y,\phi_z)$ that transforms a point (x,y,z) in the first domain to a point (X,Y,Z) in the second domain is defined by $$\begin{cases} X = \phi_x(x, y, z) = x + u_x(x, y, z) \\ Y = \phi_y(x, y, z) = y + u_y(x, y, z) \\ Z = \phi_z(x, y, z) = z + u_z(x, y, z) \end{cases}$$

where $u_x$, $u_y$, $u_z$ are displacement fields, and calculating a quality factor as a function of the of the displacement fields and the Jacobian matrix $D\Phi(x,y,z)$ of the deformation fields. The quality factor is a measure of the quality of said deformation field.

18 Claims, 5 Drawing Sheets

OTHER PUBLICATIONS

International Search Report including Notification of Transmittal of the International Search Report, International Search Report and Written Opinion of the International Searching Authority, PCT Appln. No. PCT/US2006/001531, mailed Sep. 8, 2006.

* cited by examiner

SYSTEM AND METHOD FOR QUANTIFYING THE QUALITY OF MOTION CORRECTION IN IMAGE REGISTRATION

CROSS REFERENCE TO RELATED UNITED STATES APPLICATION

This application claims priority from "Method for Quantifying the Quality of a Non-Rigid Deformation Field", U.S. Provisional Application No. 60/668,013 of Gerardo Hermosillo Valadez, filed Apr. 4, 2005, the contents of which are incorporated herein by reference.

TECHNICAL FIELD

This invention is directed to the automatic evaluation of the quality of registration between two or more digitized images.

DISCUSSION OF THE RELATED ART

The diagnostically superior information available from data acquired from current imaging systems enables the detection of potential problems at earlier and more treatable stages. Given the vast quantity of detailed data acquirable from imaging systems, various algorithms must be developed to efficiently and accurately process image data. With the aid of computers, advances in image processing are generally performed on digital or digitized images.

Digital images are created from an array of numerical values representing a property (such as a grey scale value or magnetic field strength) associable with an anatomical location points referenced by a particular array location. The set of anatomical location points comprises the domain of the image. In 2-D digital images, or slice sections, the discrete array locations are termed pixels. Three-dimensional digital images can be constructed from stacked slice sections through various construction techniques known in the art. The 3-D images are made up of discrete volume elements, also referred to as voxels, composed of pixels from the 2-D images. The pixel or voxel properties can be processed to ascertain various properties about the anatomy of a patient associated with such pixels or voxels. Computer-aided diagnosis ("CAD") systems play a critical role in the analysis and visualization of digital imaging data.

In many diagnostic settings, a previously obtained volumetric image is used to guide a medical procedure, such as an examination of an organ. During the course of this procedure, new readings of the organ are frequently acquired that need to be correlated with the volumetric image guiding the examination. These new readings need not be from the same imaging modality used to create the volumetric image. For example, during an electrophysiological examination of the heart, a map of the electric properties of the heart wall is acquired. To support a diagnosis, a 3D CT or MR scan is often acquired before the procedure. These scans typically show quite well the boundary between the inside of the heart chambers and the heart wall, as determined by look-up tables that map pixels in the inside of the chamber to transparent opacity values. Since these images are complementary to each other, the integration of useful data from separate images is often desired. Registration, a first step in this integration process, aims to bring the multiple images involved into spatial alignment.

Image registration is an optimization problem that finds a geometric transformation that maps points from a source dataset space into homologous points in a target dataset space. Registration of 2D/3D medical images is a vital component of a large number of registration and fusion applications. In the areas of diagnosis, planning, evaluation of surgical and radio-therapeutical procedures, typically multiple single-modality, or multi-modality images are acquired in the clinical track of events. Since these images are complementary to each other, the integration of useful data from separate images are often desired. Registration, a first step in this integration process, aims to bring the multiple images involved into spatial alignment. The objective of image registration is to describe a geometric mapping between two images with some kind of a model, which usually is dependent on parameters, known as registration parameters. The model determines the type of registration, whether it is a rigid, affine, deformable, registration, etc., and therefore the specifics of the registration parameters. N-D dynamic registration is defined as the registration between n-dimensional image datasets where at least one of them is changing over time (moving, deforming, etc.). Image registration has been studied in various contexts due to its significance in a wide range of areas, including medical image fusion, remote sensing, recognition, tracking, mosaicing, and so on.

Registration can be characterized as either rigid or non-rigid. Rigid registration considers only rotation and translation of the whole image to make it fit to the image to it is to be registered. In the case of 2D images, there are three registration parameters: one for the rotation and two for translation. Non-rigid registration includes, apart from these rigid transformations, affine transformations and deformable transformations. In an extreme case each pixel of a first image can be mapped to a pixel of the second image, independently of the rest of the image. Non-rigid registration has to be specified more precisely when it comes to its actual implementation. Usually a deformation is modeled in a certain way and parameterized.

Image registration aims to spatially align one image to another. For that purpose, parameters of a global transformation model, such as a rigid, affine or projective transformation, are to be recovered to geometrically transform a moving image to achieve high spatial correspondence with a fixed image. The problem has been studied in various contexts due to its significance in a wide range of areas, including medical image fusion, remote sensing, recognition, tracking, mosaicing, and so on.

Perfusion image sequences are a common diagnostic tool. In a typical scenario, an image of a region of interest in a patient's body is acquired previous to the injection of a contrast agent. As the agent diffuses through the patient's blood stream, one or more images of the same region are acquired. Typically, regions that enhance due to contrast agent intake are considered suspicious, as, for example, in the case of a breast magnetic resonance (MR) diagnosis. By viewing the subtraction of any of the post-contrast images from the pre-contrast images, a physician can quickly locate suspicious regions. Unfortunately, however, patient motion can introduce artifacts that render this task more difficult, time consuming, and less accurate.

To reduce these artifacts, a motion correction step can be performed that compensates to some extant for patient motion, which is typically non-rigid. A number of methods of motion correction for series of time-successive images (scenes) are known from the literature. FIG. 1 illustrates an example of the results of a motion correction algorithm applied to a perfusion sequence of the breast. The image on the left depicts the subtraction between the first post-contrast image minus the pre-contrast image. The right hand image depicts the same subtraction after motion correction. One outstanding issue concerning non-rigid registration is the automatic evaluation of the quality of the registration.

SUMMARY OF THE INVENTION

Exemplary embodiments of the invention as described herein generally include methods and systems for automatically evaluating the quality of a deformation field produced by a motion correction algorithm by measuring the closeness of the deformation found by the algorithm to an ideal correction, one that is small and almost rigid. Providing these measures allows for the automatic evaluation of any motion correction algorithm by comparing the measure before and after the correction. Potential applications include the automatic comparison of different motion correction algorithms, the automatic triggering of a motion correction step, and the automatic tuning of the parameters of a given motion correction algorithm.

According to an aspect of the invention, there is provided a method of evaluating the quality of a deformation field, including providing a deformation field from a first domain to a second domain, calculating a quality factor of the deformation field, and rejecting said deformation field if its quality factor has magnitude less than a predetermined value.

According to a further aspect of the invention, the deformation field $\Phi=(\phi_x,\phi_y,\phi_z)$ that transforms a point $(x,y,z)$ in the first domain to a point $(X,Y,Z)$ in the second domain is $$\begin{cases} X = \phi_x(x, y, z) = x + u_x(x, y, z) \\ Y = \phi_y(x, y, z) = y + u_y(x, y, z) \\ Z = \phi_z(x, y, z) = z + u_z(x, y, z) \end{cases}$$

wherein $u_x$, $u_y$, $u_z$ are displacement fields.

According to a further aspect of the invention, the quality factor is a function of the of the displacement fields and the Jacobian matrix $D\Phi(x,y,z)$ of the deformation fields.

According to a further aspect of the invention, the quality factor is a function of one or more of $$\alpha_1 = \frac{1}{N}\sum_{x,y,z} \min\left(|D\phi|(x, y, z), \frac{1}{|D\phi|(x, y, z)}\right),$$

$$\alpha_2 = \min_{x,y,z}\left(\min\left(|D\phi|(x, y, z), \frac{1}{|D\phi|(x, y, z)}\right)\right),$$

$$\alpha_3 = \frac{1}{N}\sum_{x,y,z} \sqrt{u_x(x, y, z)^2 + u_y(x, y, z)^2 + u_z(x, y, z)^2},$$

$$\alpha_4 = \max_{x,y,z}\sum_{x,y,z} \sqrt{u_x(x, y, z)^2 + u_y(x, y, z)^2 + u_z(x, y, z)^2},$$

wherein N is the number of points in the domain, and $|D\Phi|(x,y,z)$ is the determinant of the Jacobian matrix of the deformation fields.

According to a further aspect of the invention, the quality factor QF is defined as $$QF = \frac{1}{4}\sum_{i=1}^{4} w_i(\alpha_i),$$

wherein $w_1$, $w_2$, $w_3$, $w_4$ are weighting functions wherein $w_1$ and $w_2$ increase in value from 0 to 1 as the argument increases in value from 0 to 1, and $w_3$ and $w_4$ decrease in value from 1 to 0 as the argument increases in value from 0 to 1.

According to a further aspect of the invention, the weighting functions $w_1$, $w_2$, $w_3$, $w_4$ comprise the definitions $$w_1(x)=\exp(-\beta_1(1-x)^{n1}),$$

$$w_2(x)=\exp(-\beta_2(1-x)^{n2}),$$

$$w_3(x)=\exp(-\beta_3 x^{n3}),$$

$$w_4(x)=\exp(-\beta_4 x^{n4}),$$

wherein $\beta_1$, $\beta_2$, $\beta_3$, $\beta_4$, $n_1$, $n_2$, $n_3$, and $n_4$ are determined by experiment.

According to a further aspect of the invention, $\beta_1\lambda 10.00$, $\beta_2\lambda 10.00$, $\beta_3\lambda 30.0033$, $\beta_4\lambda 0.00002$, $n_1\lambda 4.3$, $n_2\lambda 8.0$, $n_3\lambda 3.3$, and $n_4\lambda 5.0$.

According to a further aspect of the invention, the deformation field is approximately rigid, as determined by the values of either $w_1(\alpha_1)$ or $w_2(\alpha_2)$.

According to a further aspect of the invention, the magnitude of the displacement fields is small, as determined by the values of either $w_3(\alpha_3)$ or $w_4(\alpha_4)$.

According to a further aspect of the invention, the predetermined value of said quality factor magnitude is about 0.5.

According to a further aspect of the invention, the deformation field defines a registration between two digitized images, wherein said first domain is the domain of a first of said two images, and said second domain is the domain of the other of said two images.

According to another aspect of the invention, there is provided a program storage device readable by a computer, tangibly embodying a program of instructions executable by the computer to perform the method steps for evaluating the quality of a deformation field.

DETAILED DESCRIPTION OF THE PREFERRED EMBODIMENTS

Figure 1:
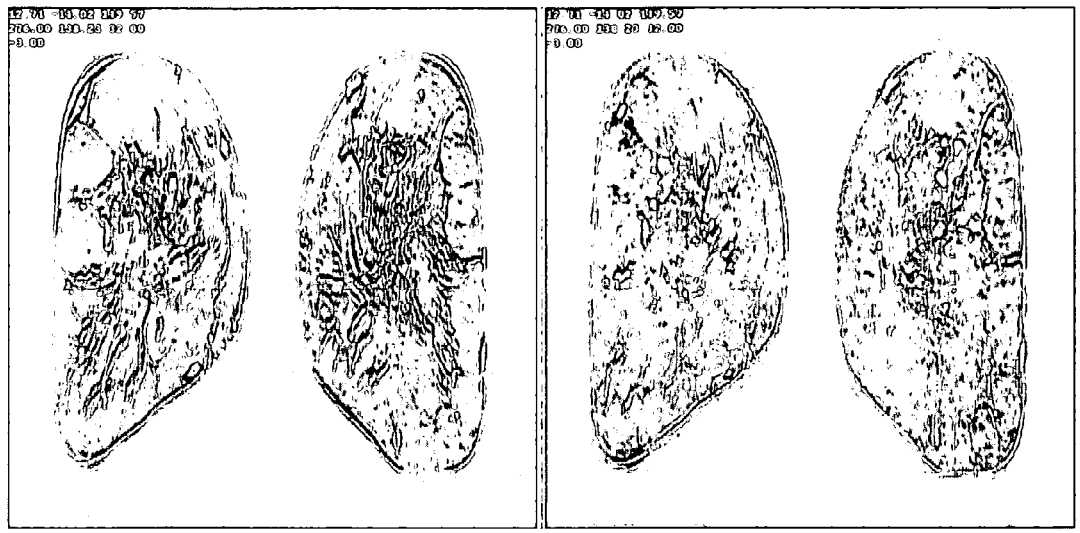
FIG. 1 illustrates an example of the results of a motion correction algorithm applied to a perfusion sequence of the breast, according to an embodiment of the invention.

Exemplary embodiments of the invention as described herein generally include systems and methods for quantifying the amount of motion artifacts in a perfusion sequence, and measuring the closeness of a registration deformation to an ideal deformation.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Image registration between a pair of images $I_1: \Omega \subset R^3 \mapsto R$ and $I_2: \Omega \subset R^3 \mapsto R$ seeks a coordinate transformation $\Phi: \Omega \mapsto \Omega$ between the 3D image domains such that $I_1 \approx I_2 \circ \Phi$. Note that the product here is a composition of mappings, in that the transformed $I_2$ is a function of the transformed domain $\Phi$. It is sometimes more convenient to determine a displacement field u, where $\Phi=\text{Id}+u$, where Id represents the identity map. Assuming the images have the same modality, the idea is to maximize their similarity by, for example, minimizing the sum of squared differences between their intensities. For the case where the two images represent images acquires before and after the injection of a contrast agent into an organ such as the lungs, the transformation $\Phi$ serves to correct for motion of the lungs between the acquisition of the two images.

According to an embodiment of the invention, a motion correction algorithm finds a change of coordinates $$\begin{pmatrix} x \\ y \\ z \end{pmatrix} \rightarrow \begin{pmatrix} X \\ Y \\ Z \end{pmatrix}$$

defined by $$\begin{cases} X = \phi_x(x, y, z) = x + u_x(x, y, z) \\ Y = \phi_y(x, y, z) = y + u_y(x, y, z) \\ Z = \phi_z(x, y, z) = z + u_z(x, y, z) \end{cases}$$

where $u_x$, $u_y$, $u_z$ are the displacements found.

Under a change of coordinates $(x,y,z) \rightarrow (\phi_1(x,y,z), \phi_2(x,y,z), \phi_3(x,y,z))$, where $\phi_1$, $\phi_2$, and $\phi_3$ are differentiable functions, the local change of volume at a point is given by the determinant of the Jacobian matrix of the deformation:

$$D\phi = \begin{pmatrix} \frac{\partial \phi_1}{\partial x} & \frac{\partial \phi_1}{\partial y} & \frac{\partial \phi_1}{\partial z} \\ \frac{\partial \phi_2}{\partial x} & \frac{\partial \phi_2}{\partial y} & \frac{\partial \phi_2}{\partial z} \\ \frac{\partial \phi_3}{\partial x} & \frac{\partial \phi_3}{\partial y} & \frac{\partial \phi_3}{\partial z} \end{pmatrix}.$$

When $|D\phi|(x,y,x)=1$, the local change of volume is zero, and the transformation does not reduce of increase the local volume. In this situation, the local volume is locally rigid. When $|D\phi|(x,y,x) \leq 0$, the transformation is singular: it becomes non-invertible. Values of $|D\phi|$ much greater than one are also undesirable because they imply that the local volume has increased greatly in magnitude. According to an embodiment of the invention, the condition $$|D\phi^{-1}| = \frac{1}{|D\phi|}$$

holds, where $\phi^{-1}$ is the inverse transformation, which implies that large values of $|D\phi|$ make the inverse transformation almost singular.

One desirable property of a non-rigid deformation according to an embodiment of the invention is that the deformation is as close as possible to a rigid deformation, that is, the values of $|D\phi|$ are as close as possible to one. Another desirable property of a non-rigid deformation according to an embodiment of the invention that can be used to detect motion correction failure is that the displacements $u_x$, $u_y$, $u_z$ found by the motion correction algorithm should be small.

A quality factor according to an embodiment of the invention makes use of at least the two preceding properties to determine a number that measures the closeness of the actual deformation found by a motion correction algorithm to an ideal deformation, one that is small and almost rigid.

According to an embodiment of the invention, a quality factor is defined as $$QF = \frac{1}{4} \sum_{i=1}^{4} w_i(\alpha_i),$$

where $$\alpha_1 = \frac{1}{N} \sum_{x,y,z} \min\left(|D\phi|(x, y, z), \frac{1}{|D\phi|(x, y, z)}\right),$$

$$\alpha_2 = \min_{x,y,z}\left(\min\left(|D\phi|(x, y, z), \frac{1}{|D\phi|(x, y, z)}\right)\right),$$

$$\alpha_3 = \frac{1}{N} \sum_{x,y,z} \sqrt{u_x(x, y, z)^2 + u_y(x, y, z)^2 + u_z(x, y, z)^2},$$

$$\alpha_4 = \max_{x,y,z} \sum_{x,y,z} \sqrt{u_x(x, y, z)^2 + u_y(x, y, z)^2 + u_z(x, y, z)^2},$$

and $w_1$, $w_2$, $w_3$, and $w_4$ are weighting functions. Four, exemplary, non-limiting weighting functions according to an embodiment of the invention are $$w_1(x) = \exp(-10(1-x)^{4.3}),$$

$$w_2(x) = \exp(-10(1-x)^8),$$

$$w_3(x) = \exp(-0.0033 x^{3.3}),$$

$$w_4(x) = \exp(-0.00002 x^5).$$

Figure 2:
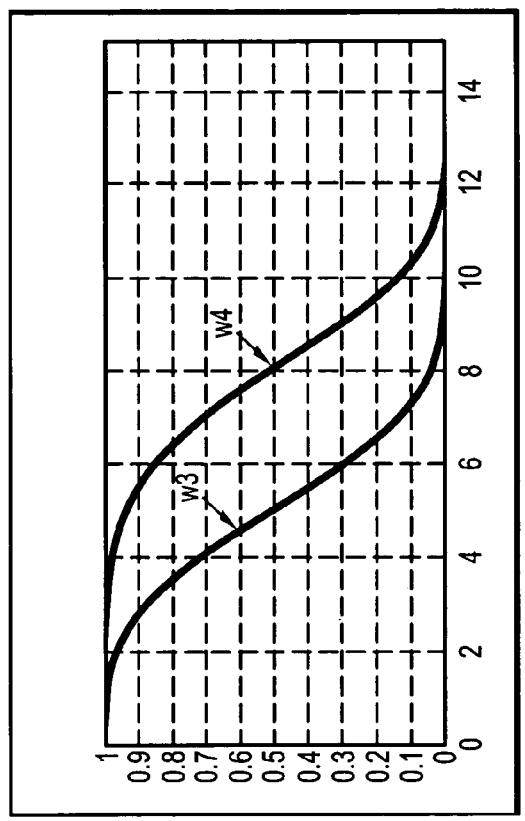
FIG. 2 is a graph of the four weighting function used for calculating a QF, according to an embodiment of the invention.
Figure 2:
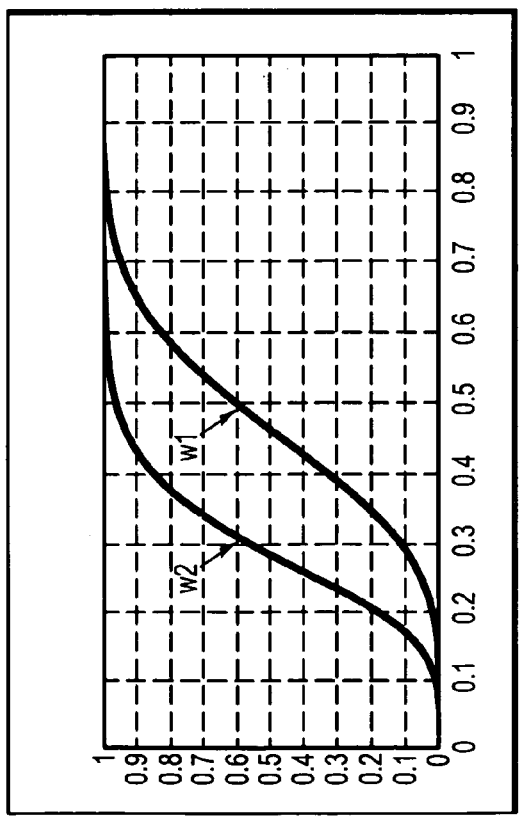

These four weighting function are plotted in FIG. 2. Referring now to the figure, $w_1$ and $w_2$ are shown in the left panel, with $w_2$ being the leftside curve and $w_1$ being the rightside curve, while $w_3$ and $w_4$ are shown in the right panel, with $w_3$ being the rightside curve and $w_4$ being the leftside curve. These four functions are exemplary and non-limiting, and any set of functions that have the general shape as those depicted in FIG. 2 can serve as weighting functions, where $w_1$ and $w_2$ increase in value from 0 to 1 as the argument increases in value from 0 to 1, and $w_3$ and $w_4$ decrease in value from 1 to 0 as the argument increases in value from 0 to 1.

According to an embodiment of the invention, $\alpha_1$ and $\alpha_2$ are related to the determinant of the Jacobean matrix, while $\alpha_3$ and $\alpha_4$ are related to the norm of the displacement. When the value of $|D\Phi|(x,y,z)$ is greater than one, the inverse $$|D\phi^{-1}|(x, y, z) = \frac{1}{|D\phi|(x, y, z)}$$

is considered instead, wherein only values between 0 and 1 need be considered. In this manner, $a_1$ represents an average volume distortion, regardless of whether it is an increase or decrease in volume, and $\alpha_2$ represents the maximum distortion over the image. Similarly, $\alpha_3$ and $\alpha_4$, respectively, represent the average and maximum norm of the displacement. Starting with these four values of $\alpha$, the weighting functions $w_1, \ldots, w_4$ were empirically determined to penalize values of $\alpha_1$, $\alpha_2$ that are smaller than one, and values of $\alpha_3$, $\alpha_4$ that are greater then 5, as illustrated in FIG. 2. With these four weighting functions, the quality factor QF will have values in the range (0.0, 1.0), or 0% to 100%, and, according to an embodiment of the invention, a motion correction for which the QF<0.5 should be rejected.

Note that examination of the functions $w_1$, $w_2$, $w_3$, $w_4$ helps to set limits on how close to one $|D\phi|$ should be, and how large the displacement can be. Referring again to FIG. 2, it can be seen that for values of $\alpha_1$ less than about 0.5, $w_1$ is less than 0.6 and rapidly decreases to zero for decreasing $\alpha 1$, and for values of $\alpha_2$ less than about 0.3, $w_2$ is less than 0.6 and rapidly decreases to zero for decreasing $\alpha 2$. Similarly, for values of $\alpha_3$ greater than about 7, the value of $w_3$ is less than 0.6 and decreases rapidly to zero for increasing $\alpha_3$, and for values of $\alpha_4$ greater than about 5, the value of $w_4$ is less than 0.5 and decreases rapidly to zero for increasing $\alpha_4$.

Other quality factors can be defined using a subset of the argument functions. A quality factor according to an embodiment of the invention can be defined from any combination of the $\alpha$ arguments. For example, a quality factor according to an embodiment of the invention can be defined using $\alpha 1$ and $\alpha 3$, the average volume distortion and displacement norm. Similarly, another quality factor according to an embodiment of the invention can be defined using $\alpha_2$ and $\alpha_4$, the maximum volume distortion and displacement norm.

Figure 6:
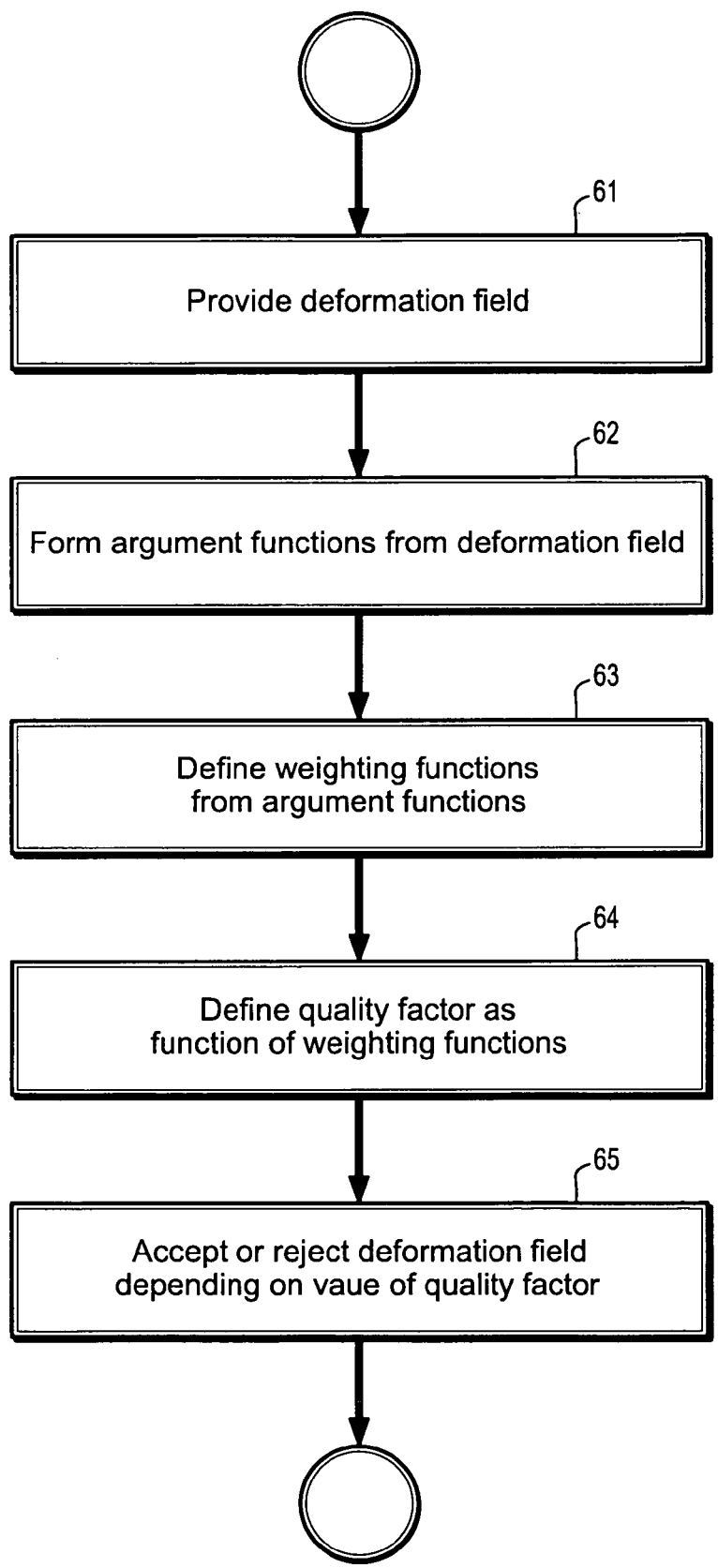
FIG. 6 is a flow chart of an exemplary method for determining a quality factor, according to an embodiment of the invention.

A flow chart of an exemplary method for determining a quality factor, according to an embodiment of the invention, is depicted in FIG. 6. Referring now to the figure, a deformation field is provided at step 61. Although this deformation field can define a registration between two digitized images, it need not do so to be within the scope of an embodiment of the invention. According to an embodiment of the invention, the deformation fields include displacement fields defined for each point in the domain of the deformation field. The deformation field can then be expressed as $\Phi(r) = r + u(r)$, where r is a 3-dimensional vector, and the displacement field u is a vector function of r. At step 62, a plurality of argument functions of the deformation field are defined. According to an embodiment of the invention, the argument functions are functions of the Jacobian matrix of the deformation fields, and of the magnitude of the displacement fields. According to another embodiment of the invention, the argument functions are $$\alpha_1 = \frac{1}{N} \sum_{x,y,z} \min\left(|D\phi|(x, y, z), \frac{1}{|D\phi|(x, y, z)}\right),$$

$$\alpha_2 = \min_{x,y,z}\left(\min\left(|D\phi|(x, y, z), \frac{1}{|D\phi|(x, y, z)}\right)\right),$$

$$\alpha_3 = \frac{1}{N} \sum_{x,y,z} \sqrt{u_x(x, y, z)^2 + u_y(x, y, z)^2 + u_z(x, y, z)^2},$$

$$\alpha_4 = \max_{x,y,z} \sum_{x,y,z} \sqrt{u_x(x, y, z)^2 + u_y(x, y, z)^2 + u_z(x, y, z)^2},$$

where N is the number of points in the domain, and $|D\phi|(x,y,z)$ is the determinant of the Jacobian matrix of the deformation fields. At step 63, a plurality of weighting functions of the argument functions are defined. According to one embodiment of the invention, the weighting functions are defined by $$w_1(\alpha_1) = \exp(-\beta_1(1-\alpha_1)^{n_1}),$$

$$w_2(\alpha_2) = \exp(-\beta_2(1-\alpha_2)^{n_2}),$$

$$w_3(\alpha_3) = \exp(-\beta_3 \alpha_3^{n_3})$$

$$w_4(\alpha_4) = \exp(-\beta_4 \alpha_4^{n_4}),$$

where $\beta_1$, $\beta_2$, $\beta_3$, $\beta_4$, $n_1$, $n_2$, $n_3$, and $n_4$ are constants determined by experiment, depending on the application. According to a further embodiment of the invention, exemplary, non-limiting values of these constants are $\beta_1 \approx 10.0$, $\beta_2 \approx 10.0$, $\beta_3 \approx 30.0033$, $\beta_4 \approx 0.00002$, $n_1 \approx 4.3$, $n_2 \approx 8.0$, $n_3 \approx 3.3$, and $n_4 \approx 5.0$. The forms of the weighting functions are exemplary, and according to a further embodiment of the invention, the weighting functions are any sigmoidally shaped function of the argument functions.

The quality factor is defined as a function of one or more of the weighting functions at step 64. In one exemplary embodiment of the invention, the quality factor is defined as $$QF = \frac{1}{4}\sum_{i=1}^{4} w_i(\alpha_i).$$

At step 65, the deformation field is accepted or rejected depending on the value of the quality factor. According to one embodiment of the invention, the quality factor is defined so that its values range from 0.0 to 1.0. In this exemplary embodiment, a deformation field is rejected if its quality factor value is less than about 0.50. Note, however, that in other embodiments of the invention, the quality factor can be defined to have values outside this range.

Figure 3:
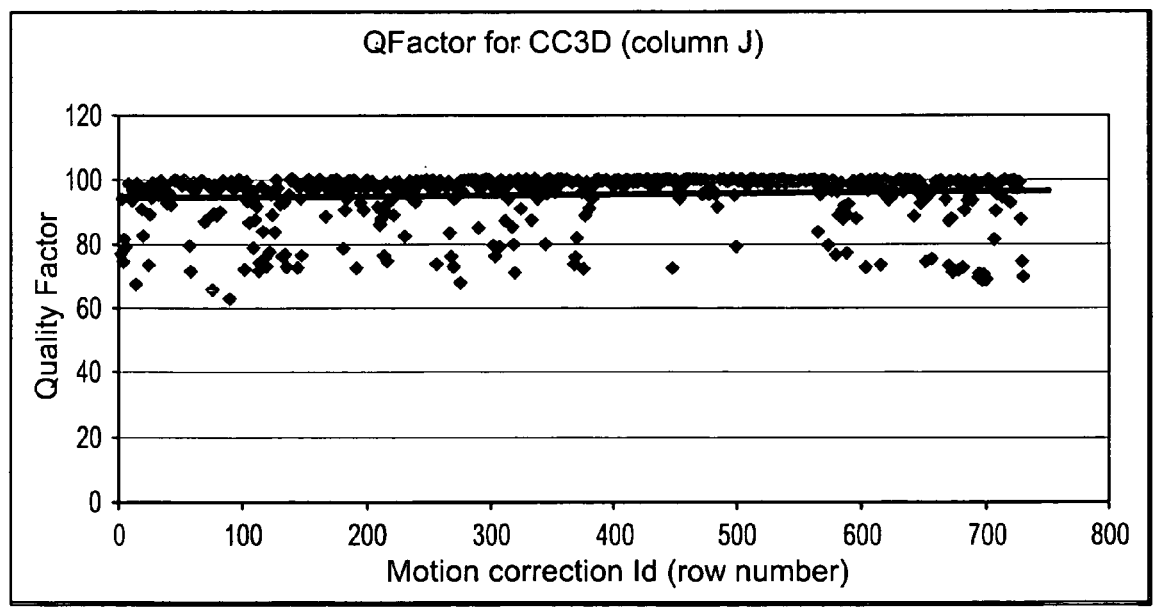
FIG. 3 is a graph of QF values obtained by evaluating the deformation fields in 729 cases of breast MRI motion correction, according to an embodiment of the invention.
Figure 4:
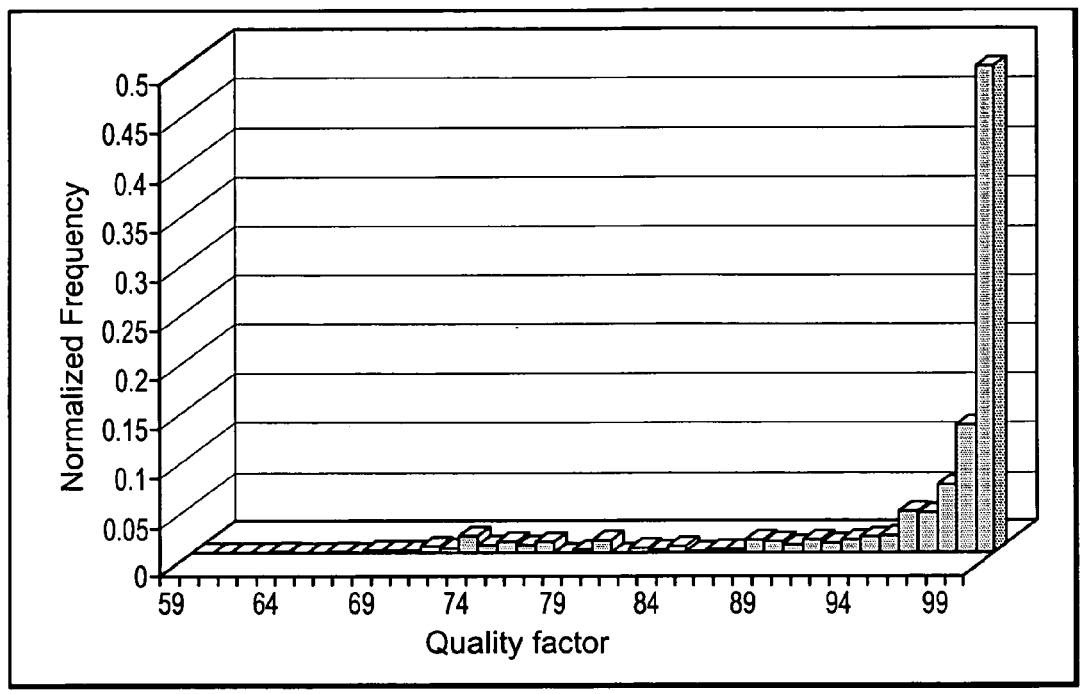
FIGS. 4 and 5, show, respectively, histograms of the QF obtained for a set of motion correction cases using a high quality algorithm labeled herein as CC, and a fast interactive algorithm labeled herein as LAP, according to an embodiment of the invention.
Figure 5:
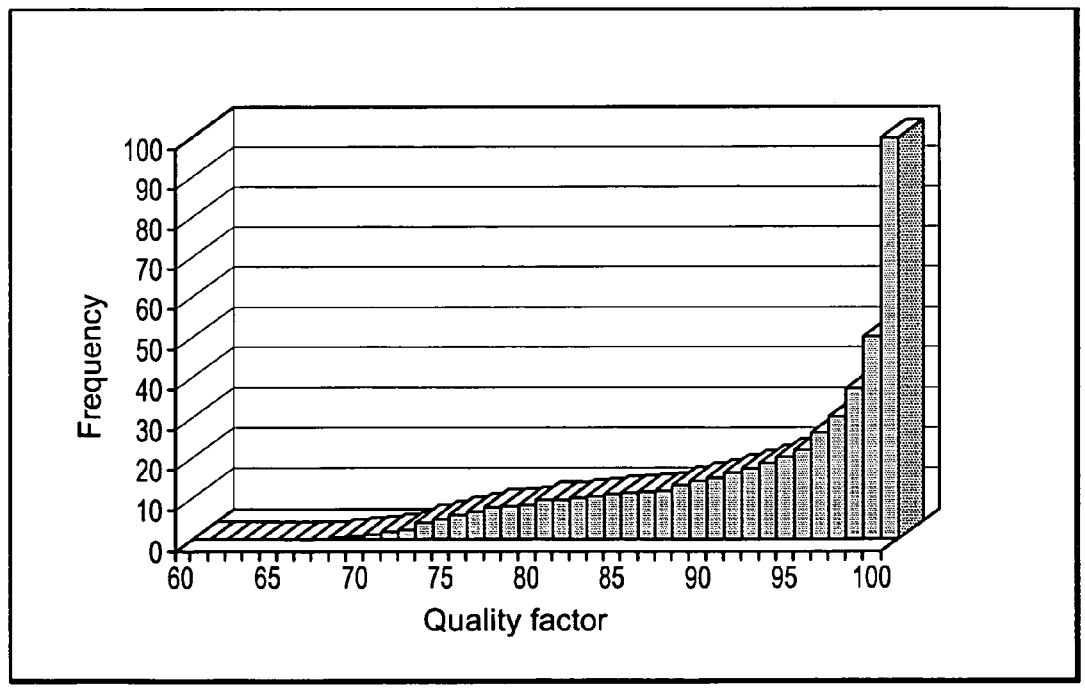

A QF according to an embodiment of the invention was used to evaluate the quality of the deformation fields in 729 cases of breast MRI motion correction. The values obtained are illustrated in FIG. 3, where the QF is plotted as a percentage as a function of case number. These values are in good agreement with a human visual evaluation of the same data. According to another embodiment of the invention, a QF was used to compare different motion correction algorithms. FIGS. 4 and 5, show, respectively, histograms of the QF obtained for a set of motion correction cases using two different algorithms, a high quality algorithm labeled herein as CC, and a fast interactive algorithm labeled herein as LAP. Comparison of the figures indicates that the CC algorithm has a far greater number of corrections with a QF of 96% or greater than the LAP histogram, in which frequencies drop off slowly from about 97% to about 70%. This suggests that the CC algorithm is a more reliable motion corrector than the LAP algorithm.

It is to be understood that various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Furthermore, it is to be understood that the present invention can be implemented in various forms of hardware, software, firmware, special purpose processes, or a combination thereof. In one embodiment, the present invention can be implemented in software as an application program tangibly embodied on a computer readable program storage device. The application program can be uploaded to, and executed by, a machine comprising any suitable architecture.

Figure 7:
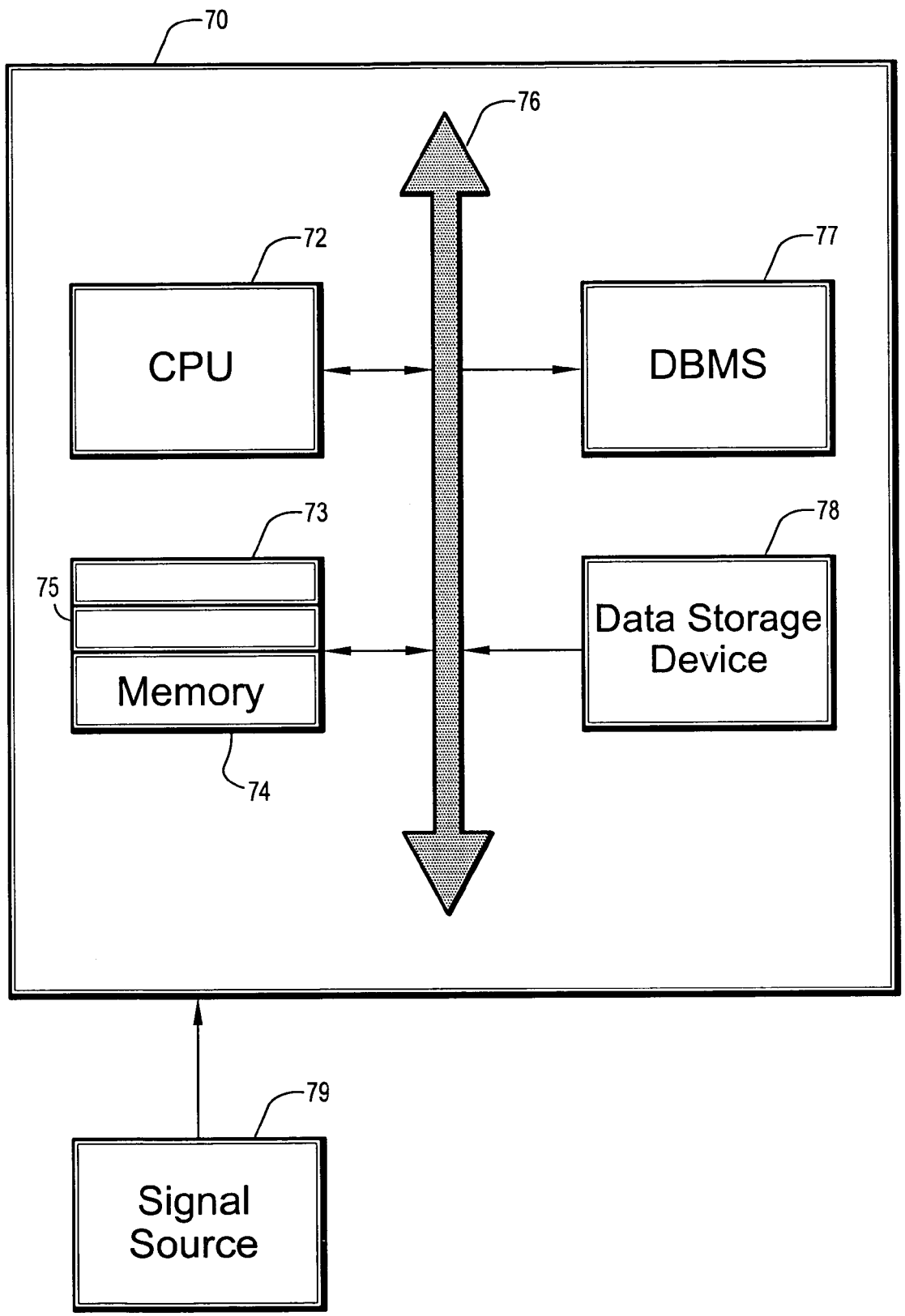
FIG. 7 is a block diagram of an exemplary computer system for implementing a method for determining a quality factor according to an embodiment of the invention.

Accordingly, FIG. 7 illustrates a hardware environment used to implement an embodiment of present invention. As illustrated in FIG. 7, one exemplary embodiment of the present invention is implemented in a server computer ("server") 70. The server 70 generally includes, a processor 72, a memory 74 such as a random access memory (RAM), a data storage device 78 (e.g., hard drive, floppy disk drive, CD-ROM disk drive, etc.), a data communication device 76 (e.g., modem, network interface device, etc.), a monitor (e.g., CRT, LCD display, etc.), a pointing device (e.g., a mouse, a track ball, a pad or any other device responsive to touch, etc.) and a keyboard. It is envisioned that attached to the computer 70 may be other devices such as read only memory (ROM), a video card drive, printers, peripheral devices including local and wide area network interface devices, etc. One of ordinary skill in the art will recognize that any combination of the above system components may be used to configure the server 70.

The server 70 operates under the control of an operating system ("OS") 73, such as Linux, WINDOWS™, WINDOWS™, etc., which typically, is loaded into the memory 74 during the server 70 start-up (boot-up) sequence after power-on or reset. In operation, the OS 73 controls the execution by the server 70 of computer programs 75, including server and/or client-server programs. Alternatively, a system and method in accordance with the present invention may be implemented with any one or all of the computer programs 75 embedded in the OS 73 itself without departing from the scope of an embodiment of the invention. Preferably, however, the client programs are separate from the server programs and may not be resident on the server.

The OS 73 and the computer programs 75 each comprise computer readable instructions which, in general, are tangibly embodied in or are readable from a media such as the memory 74, the data storage device 78 and/or the data communications device 76. The present invention can be implemented as a routine 75 that is stored in memory 74 and executed by the CPU 72 to process a signal from a signal source 79. When executed by the server 70, the instructions cause the server 70 to perform the steps necessary to implement the present invention. Thus, the present invention may be implemented as a method, apparatus, or an article of manufacture (a computer-readable media or device) using programming and/or engineering techniques to produce software, hardware, firmware, or any combination thereof.

The server 70 is typically used as a part of an information search and retrieval system capable of receiving, retrieving and/or dissemination information over the Internet, or any other network environment. One of ordinary skill in the art will recognize that this system may include more than one of server 70.

In the information search and retrieval system, such as a digital library system, a client program communicates with the server 70 by, inter alia, issuing to the server search requests and queries. The server 70 then responds by providing the requested information. The digital library system is typically implemented using a database management system software (DBMS) 77. The DBMS 77 receives and responds to search and retrieval requests and termed queries from the client. In the preferred embodiment, the DBMS 77 is server-resident.

Objects are typically stored in a relational database connected to an object server, and the information about the objects is stored in a relational database connected to a library server, wherein the server program(s) operate in conjunction with the (DBMS) 77 to first store the objects and then to retrieve the objects. One of ordinary skill in the art will recognize that the foregoing is an exemplary configuration of a system which embodies the present invention, and that other system configurations such as an ultrasound machine coupled to a workstation via network to access the data in the ultrasound machine may be used without departing from the scope and spirit of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method of evaluating the quality of a deformation field, said method comprising the steps of:
providing a deformation field $\Phi=(\phi_x,\phi_y,\phi_z)$ that transforms a point (x,y,z) in a first domain to a point (X,Y,Z) in a second domain, wherein $$\begin{cases} X = \phi_x(x, y, z) = x + u_x(x, y, z) \\ Y = \phi_y(x, y, z) = y + u_y(x, y, z) \\ Z = \phi_z(x, y, z) = z + u_z(x, y, z) \end{cases},$$

and wherein $u_x$, $u_y$, $u_z$ are displacement fields
calculating a quality factor that is function of the displacement fields and the Jacobian matrix $D\Phi(x,y,z)$ of the deformation field;
rejecting said deformation field if its quality factor has magnitude less than a predetermined value; and
providing said quality factor and rejection status of said deformation field to a user.

2. The method of claim 1, wherein said quality factor is a function of two or more of $$\alpha_1 = \frac{1}{N}\sum_{x,y,z} \min\left(|D\phi|(x, y, z), \frac{1}{|D\phi|(x, y, z)}\right),$$

$$\alpha_2 = \min_{x,y,z}\left(\min\left(|D\phi|(x, y, z), \frac{1}{|D\phi|(x, y, z)}\right)\right),$$

$$\alpha_3 = \frac{1}{N}\sum_{x,y,z} \sqrt{u_x(x, y, z)^2 + u_y(x, y, z)^2 + u_z(x, y, z)^2},$$

$$\alpha_4 = \max_{x,y,z}\sum_{x,y,z} \sqrt{u_x(x, y, z)^2 + u_y(x, y, z)^2 + u_z(x, y, z)^2},$$

wherein N is the number of points in the domain, and $|D\Phi|(x,y,z)$ is the determinant of the Jacobian matrix of the deformation fields.

3. The method of claim 2, wherein the quality factor QF comprises $$QF = \frac{1}{4}\sum_{i=1}^{4} w_i(\alpha_i),$$

wherein $w_1$, $w_2$, $w_3$, $w_4$ are weighting functions wherein $w_1$ and $w_2$ increase in value from 0 to 1 as the argument increases in value from 0 to 1, and $w_3$ and $w_4$ decrease in value from 1 to 0 as the argument increases in value from 0 to 1.

4. The method of claim 3, wherein the weighting functions $w_1$, $w_2$, $w_3$, $w_4$ comprise the definitions $w_1(x)=\exp(-\beta_1(1-x)^{n1})$, $w_2(x)=\exp(-\beta_2(1-x)^{n2})$, $w_3(x)=\exp(-\beta_3 x^{n3})$, $w_4(x)=\exp(-\beta_4 x^{n4})$, wherein $\beta_1$, $\beta_2$, $\beta_3$, $\beta_4$, $n_1$, $n_2$, $n_3$, and $n_4$ are determined by experiment.

5. The method of claim 4, wherein $\beta_1\approx 10.0$, $\beta_2\approx 10.0$, $\beta_3\approx 30.0033$, $\beta_4\approx 0.00002$, $n_1\approx 4.3$, $n_2\approx 8.0$, $n_3\approx 3.3$, and $n_4\approx 5.0$.

6. The method of claim 1, wherein the predetermined value of said quality factor magnitude is about 0.5.

7. The method of claim 1, wherein said deformation field defines a registration between two digitized images, wherein said first domain is the domain of a first of said two images, and said second domain is the domain of the other of said two images.

8. The method of claim 1, wherein providing said quality factor and rejection status of said deformation field to a user comprises one or more of outputting said quality factor and rejection status, displaying quality factor and rejection status on a display monitor, or storing quality factor and rejection status.

9. A method of evaluating the quality of a deformation field, said method comprising the steps of:
providing a deformation field from a first domain to a second domain, wherein said deformation field $\Phi=(\phi_x,\phi_y,\phi_z)$ that transforms a point (x,y,z) in the first domain to a point (X,Y,Z) in the second domain comprises $$\begin{cases} X = \phi_x(x, y, z) = x + u_x(x, y, z) \\ Y = \phi_y(x, y, z) = y + u_y(x, y, z) \\ Z = \phi_z(x, y, z) = z + u_z(x, y, z) \end{cases},$$

wherein $u_x$, $u_y$, $u_z$ are displacement fields;
calculating a quality factor as a function of the displacement fields and the Jacobian matrix $D\Phi(x,y,z)$ of the deformation fields, wherein said quality factor is a measure of the quality of said deformation field; and
providing said quality factor to a user.

10. The method of claim 9, further comprising rejecting said deformation field if its quality factor has magnitude less than a predetermined value.

11. A program storage device readable by a computer, tangibly embodying a program of instructions executable by the computer to perform the method steps for evaluating the quality of a deformation field, said method comprising the steps of:
providing a deformation field $\Phi=(\phi_x,\phi_y,\phi_z)$ that transforms a point (x,y,z) in a first domain to a point (X,Y,Z) in a second domain, wherein $$\begin{cases} X = \phi_x(x, y, z) = x + u_x(x, y, z) \\ Y = \phi_y(x, y, z) = y + u_y(x, y, z) \\ Z = \phi_z(x, y, z) = z + u_z(x, y, z) \end{cases},$$

and wherein $u_x$, $u_y$, $u_z$ are displacement fields;
calculating a quality factor that is a function of the displacement fields and the Jacobian matrix $D\Phi(x,y,z)$ of the deformation field;
rejecting said deformation field if its quality factor has magnitude less than a predetermined value; and
providing said quality factor and rejection status of said deformation field to a user.

12. The computer readable program storage device of claim 11, wherein said quality factor is a function of two or more of $$\alpha_1 = \frac{1}{N}\sum_{x,y,z} \min\left(|D\phi|(x, y, z), \frac{1}{|D\phi|(x, y, z)}\right),$$

$$\alpha_2 = \min_{x,y,z}\left(\min\left(|D\phi|(x, y, z), \frac{1}{|D\phi|(x, y, z)}\right)\right),$$

-continued $$\alpha_3 = \frac{1}{N}\sum_{x,y,z}\sqrt{u_x(x,y,z)^2 + u_y(x,y,z)^2 + u_z(x,y,z)^2},$$

$$\alpha_4 = \max_{x,y,z}\sum_{x,y,z}\sqrt{u_x(x,y,z)^2 + u_y(x,y,z)^2 + u_z(x,y,z)},$$

wherein N is the number of points in the domain, and $|D\Phi|(x,y,z)$ is the determinant of the Jacobian matrix of the deformation fields.

13. The computer readable program storage device of claim 12, wherein the quality factor QF comprises $$QF = \frac{1}{4}\sum_{i=1}^{4} w_i(\alpha_i),$$

wherein $w_1$, $w_2$, $w_3$, $w_4$ are weighting functions wherein $w_1$ and $w_2$ increase in value from 0 to 1 as the argument increases in value from 0 to 1, and $w_3$ and $w_4$ decrease in value from 1 to 0 as the argument increases in value from 0 to 1.

14. The computer readable program storage device of claim 13, wherein the weighting functions $w_1$, $w_2$, $w_3$, $w_4$ comprise the definitions $$w_1(x)=\exp(-\beta_1(1-x)^{n_1}),$$

$$w_2(x)=\exp(-\beta_2(1-x)^{n_2}),$$

$$w_3(x)=\exp(-\beta_3 x^{n_3}),$$

$$w_4(x)=\exp(-\beta_4 x^{n_4})$$

wherein $\beta_1$, $\beta_2$, $\beta_3$, $\beta_4$, $n_1$, $n_2$, $n_3$, and $n_4$ are determined by experiment.

15. The computer readable program storage device of claim 14, wherein $\beta_1 \approx 10.0$, $\beta_2 \approx 10.0$, $\beta_3 \approx 30.0033$, $\beta_4 \approx 0.00002$, $n_1 \approx 4.3$, $n_2 \approx 8.0$, $n_3 \approx 3.3$, and $n_4 \approx 5.0$.

16. The computer readable program storage device of claim 11, wherein the predetermined value of said quality factor magnitude is about 0.5.

17. The computer readable program storage device of claim 11, wherein said deformation field defines a registration between two digitized images, wherein said first domain is the domain of a first of said two images, and said second domain is the domain of the other of said two images.

18. The computer readable program storage device of claim 11, wherein providing said quality factor and rejection status of said deformation field to a user comprises one or more of outputting said quality factor and rejection status, displaying quality factor and rejection status on a display monitor, or storing quality factor and rejection status.

* * * * *